(12) United States Patent
Yebka et al.

(10) Patent No.: US 10,389,000 B2
(45) Date of Patent: Aug. 20, 2019

(54) CURRENT DISTRIBUTION FOR BATTERY PACK MANAGEMENT

(71) Applicant: Lenovo (Singapore) Pte. Ltd., Singapore (SG)

(72) Inventors: Bouziane Yebka, Apex, NC (US); Joseph Anthony Holung, Wake Forest, NC (US); Tin-Lup Wong, Chapel Hill, NC (US); Philip John Jakes, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 437 days.

(21) Appl. No.: 15/130,131

(22) Filed: Apr. 15, 2016

(65) Prior Publication Data

US 2017/0214102 A1    Jul. 27, 2017

Related U.S. Application Data

(63) Continuation-in-part of application No. 15/006,862, filed on Jan. 26, 2016, now abandoned.

(51) Int. Cl.
*H01M 10/50* (2006.01)
*H01M 10/617* (2014.01)
*H01M 10/42* (2006.01)
*H01M 10/652* (2014.01)

(52) U.S. Cl.
CPC ....... *H01M 10/617* (2015.04); *H01M 10/425* (2013.01); *H01M 10/652* (2015.04); *H01M 2010/4271* (2013.01)

(58) Field of Classification Search
CPC ............. H01M 10/617; H01M 10/652; H01M 10/425; H01M 2010/4271
See application file for complete search history.

(56) References Cited

U.S. PATENT DOCUMENTS

| 7,847,522 B2* | 12/2010 | Tashiro | ............... | H01M 10/486 249/61 |
| 2014/0253040 A1* | 9/2014 | Michalske | ............ | H02J 7/0014 320/126 |

* cited by examiner

*Primary Examiner* — Jane J Rhee
(74) *Attorney, Agent, or Firm* — Ference & Associates LLC

(57) ABSTRACT

One embodiment provides an apparatus, including: a processor; a memory operatively coupled to the processor; and a battery pack supplying power to the processor and the memory; said battery pack comprising: a plurality of cells, wherein a current flow through the plurality of cells is arranged as a function of temperature of at least a portion of the battery pack. Other aspects are described and claimed.

19 Claims, 8 Drawing Sheets

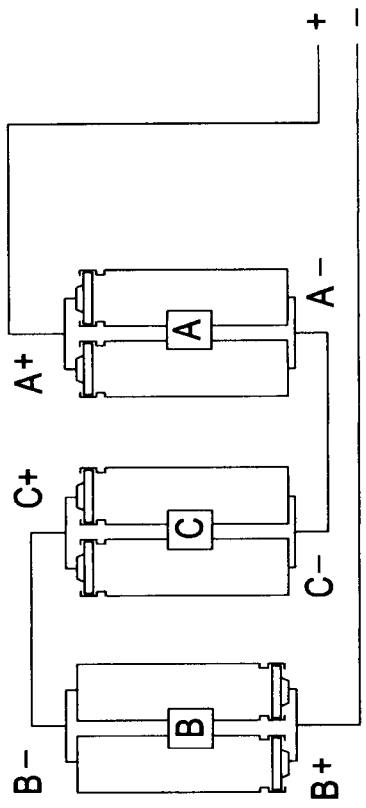
FIG. 4B
FIG. 4C
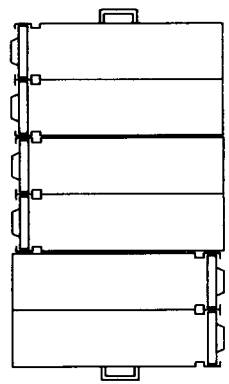
FIG. 4A

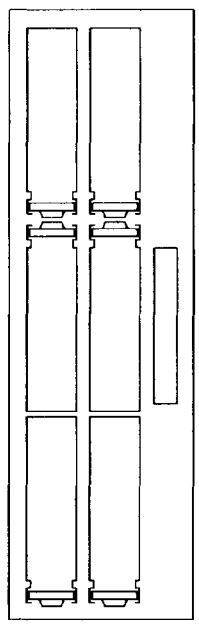
FIG. 5A
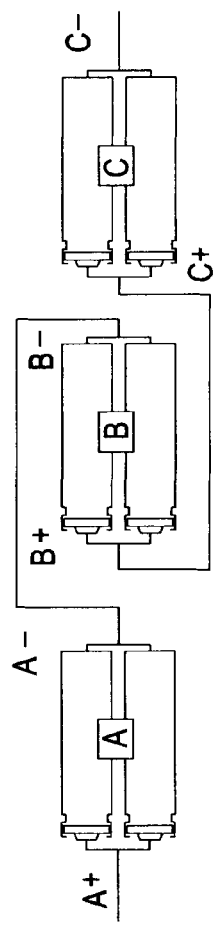
FIG. 5B
FIG. 5C

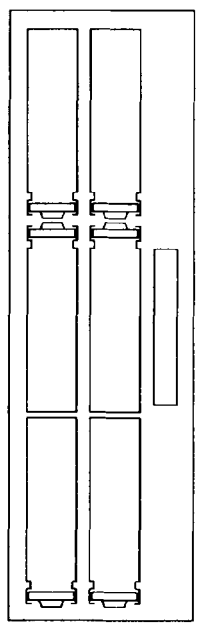
FIG. 6A
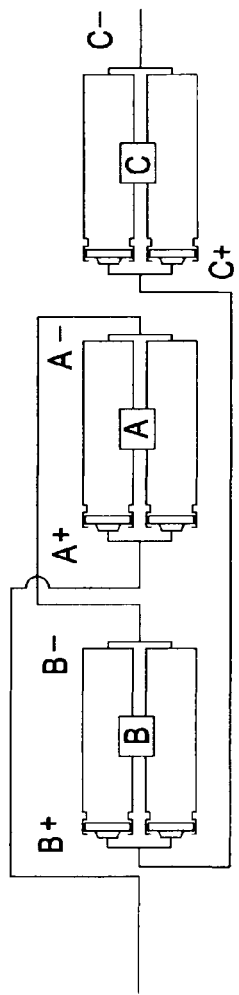
FIG. 6B
FIG. 6C

CURRENT DISTRIBUTION FOR BATTERY PACK MANAGEMENT

CROSS-REFERENCE TO RELATED APPLICATIONS

This application is a continuation-in-part of U.S. application Ser. No. 15/006,862, filed Jan. 26, 2016, the contents of which are incorporated by reference herein.

BACKGROUND

Electronic devices, such as personal electronic devices (particularly mobile electronic devices such as laptops), as well as other devices and apparatuses that derive power from a battery (e.g., electronic vehicles, hybrid vehicles and the like) rely on rechargeable batteries for power to operate, at least part of the time. As such, these devices include rechargeable batteries, typically in the form of a battery pack that includes a plurality of individual battery cells, whether in the form of can-type cells or some alternative cell type.

Battery cells produce heat as they operate, i.e., when charging and discharging. As such, cooling techniques are applied in an effort to regulate or manage the heat of the battery pack. Conventional management approaches include operating a fan to provide cooling air, operating a pump to provide another cooling medium (e.g., water cooling fluid), offering a heat sink to draw heat away from the battery pack, or a suitable combination of the foregoing.

BRIEF SUMMARY

In summary, one aspect provides an apparatus, comprising: a processor; a memory operatively coupled to the processor; and a battery pack supplying power to the processor and the memory; said battery pack comprising: a plurality of cells, wherein a current flow through the plurality of cells is arranged as a function of temperature of at least a portion of the battery pack.

Another aspect provides a battery pack, comprising: a plurality of cells, a current flow through the plurality of cells is arranged as a function of temperature of at least a portion of the battery pack.

A further aspect provides a method, comprising: determining, for a battery pack comprising a plurality of cells, a current flow arrangement for the plurality of cells; said current flow arrangement being configured as a function of temperature of at least a portion of the battery pack; and physically arranging the plurality of cells according to the determined current flow arrangement.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4(A-C) illustrates another example battery pack cell arrangement.

FIG. 5(A-C) illustrates another example battery pack cell arrangement.

FIG. 6(A-C) illustrates another example battery pack cell arrangement.

DETAILED DESCRIPTION

Figure 1:
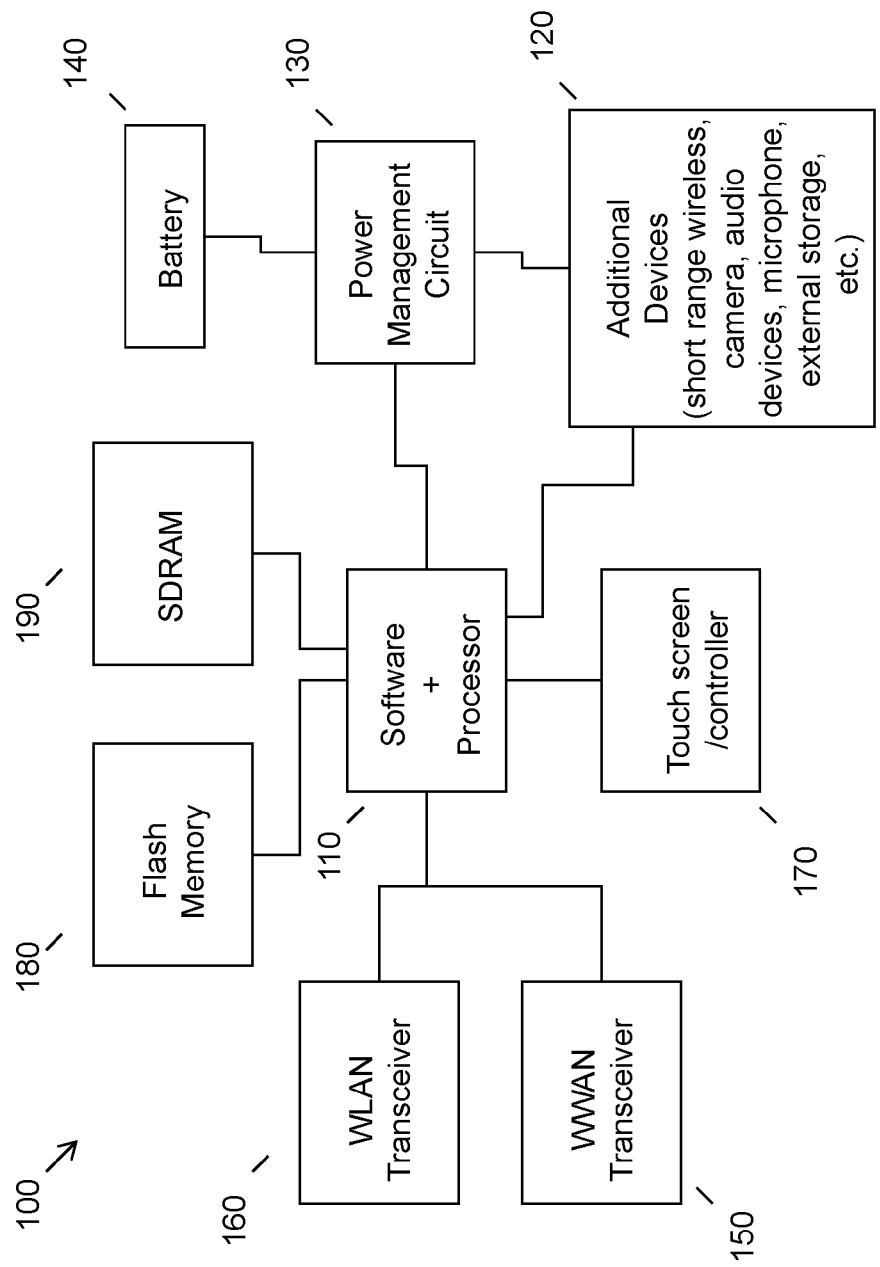
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Differences in the temperature at which a battery pack itself operates tend to minimally affect the longevity and charging capacity of the battery pack. Thus, if a battery pack normally operates at 60° C. as opposed to 45° C., after the battery pack has passed through many charge/discharge cycles (e.g., 1000), the battery pack may lose 30 to 35 percent of its capacity. While this is not negligible, it is also not debilitating from a performance standpoint.

However, if the temperature gradient within the battery pack itself varies, the battery pack suffers greatly. For example, if the battery pack has in it one cell that operates at a temperature of 30° C. and another, adjacent cell that operates at 50° C., the battery pack's cells will not remain usable (retain a sufficient charging capacity) for as long as (for as many charge/discharge cycles) a battery pack where the cells of the pack operate at or near the same temperature, e.g., 30° C. and 30° C.

Typically, the cells of the battery pack will have characteristic heat generation. The heat generation by the cell in a battery pack can be influenced by a variety of factors. The characteristic heat generation of a cell in a battery pack may be empirically determined or may be predicted, with or without validation. Thus, the amount of heat a given cell within a battery pack will generate can be determined.

Thus, an embodiment provides a battery pack in which the cells of the battery pack are physically arranged according to a configuration that reduces or minimizes the temperature gradient of the battery pack. The temperature gradient of the battery pack may be defined in a variety of ways. For example, the temperature gradient of the battery pack may be defined as the difference in temperature between one end or side of the battery pack and another side or end of the battery pack. Also, the temperature gradient of the battery pack may be defined as the localized, inter-cell difference in temperature between any two or more battery cells.

In an embodiment, the cells are characterized to determine their operating temperatures. Again, this characterization may be the result of empirical testing and measuring of the cell's operating temperature, may be the result of modeling or predicting the cell's operating temperature, or a combination of the foregoing.

If a cell's operating temperature is known, its placement in the battery pack may be intelligently chosen based on the knowledge of other cells' operating temperatures. Thus, in an embodiment, a cell that operates at or above a predetermined temperature may be spaced from another such cell in order to reduce the overall temperature gradient of the battery pack.

In an embodiment, a cell that operates at or above a predetermined temperature may be placed next to another such cell in order to minimize the inter-cell temperature difference between the two cells.

In an embodiment, the cells may be physically arranged by placement within a particular position of the battery pack.

In an embodiment, the cells may be physically arranged by orienting asymmetric cells in a particular orientation.

In an embodiment, the cells may be physically arranged by changing their terminal contacts to link them operatively with different cells in the battery pack, e.g., non-adjacent cells, non-adjacent terminals, etc.

Thus, in an embodiment, the current flow through the cells of the battery pack is specifically arranged to reduce the temperature gradient for the battery pack.

Embodiments are not limited to cooling techniques that are applied only to regulate or manage the heat of the battery pack; rather, embodiments also enable extending high operating voltage or current regions when a high charge or discharge rate is/are needed.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may include a plurality of rechargeable cells in a battery pack that is recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., short range wireless communication devices. System 100 often includes a touch screen 170 for data input and display/rendering. System 100 also typically includes various memory devices, for example flash memory 180 and SDRAM 190.

Figure 2:
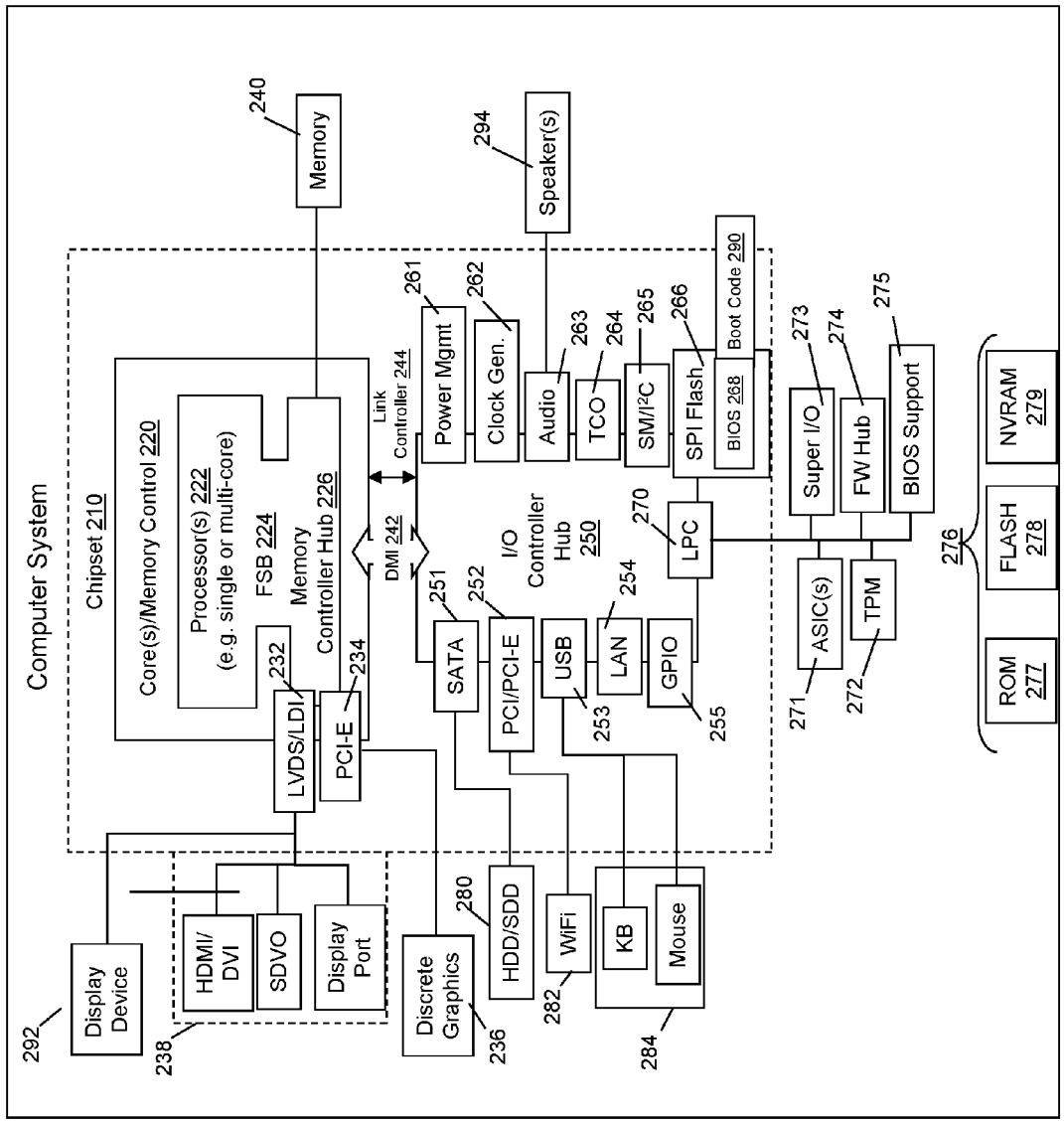
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that operate using power supplied from a battery pack including a plurality of rechargeable battery cells. In the following description, example battery pack configurations are provided to illustrate that certain physical arrangements of the cells can be utilized to reduce the temperature gradient of the battery pack, including for example reducing cell-to-cell temperature differences. This reduction in temperature gradient permits the cells to of the battery pack to last longer, e.g., to retain charging and discharging capacity for a larger number of charge/discharge cycles.

Figures 3A, 3B, 3C:
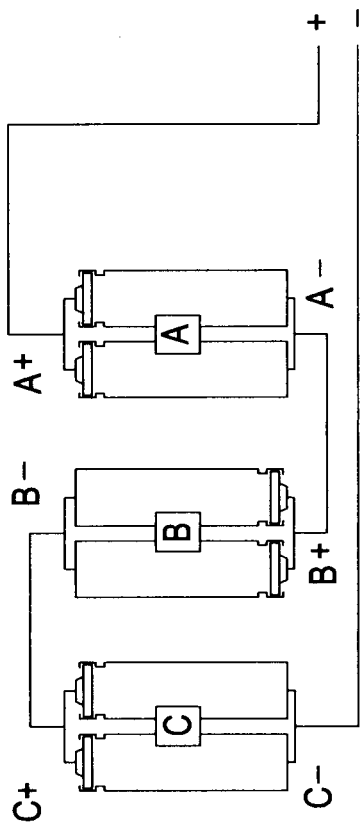
FIG. 3(A-C) illustrates an example battery pack cell arrangement.

Shown in FIG. 3(A-C) is an example battery pack cell configuration. The battery pack illustrated in FIG. 3A includes six individual cells, each paired with another cell. The two middle cells are physically inverted with respect to the pairs of cells at the ends of the battery pack. If the terminals of the cells are connected as illustrated in FIG. 3B, then the temperature distribution or gradient illustrated in FIG. 3C results during operation (charge/discharge of the battery pack). As shown in FIG. 3C, the cells of the battery pack produce a temperature gradient for the battery pack of 68° C.–45° C.=23° C. This represents an operating temperature difference of 23° C. between the A+ terminal contact and the C− terminal contact.

The configuration of the cells and terminal connections illustrated in FIGS. 3A and 3B, and resultant temperature gradient shown in FIG. 3C, may be contrasted with that shown in FIG. 4(A-C). In FIG. 4A, the central cells have been inverted with respect to their orientation shown in FIG. 3A and the cell terminal connections have been altered as shown in FIG. 4B. This results in a different current flow throughout the battery pack and thus an operating temperature gradient that is reduced, as shown in FIG. 4 C. This different physical arrangement of cells and their terminal connections reduces the battery pack temperature gradient to 68° C.–54° C.=14° C., i.e., a 9° C. improvement over the arrangement shown in FIG. 3A-3B. This improves the longevity of the battery pack in FIG. 4(A-B) in comparison to that shown in FIG. 3A-3B, such that the arrangement illustrated in FIG. 4A-4B results in a battery pack that retains more of its charging capacity for a larger number of charge/discharge cycles.

FIG. 5(A-C) and FIG. 6(A-C) also illustrate the concept that the cells of the battery pack may be physically arranged (by altering their orientation, placement, and/or terminal connections) to alter the current flow and thus minimize the battery pack's temperature gradient. This more evenly distributes the heat throughout the battery pack such that the battery pack's longevity is increased.

As shown in FIG. 5A, a six cell battery pack may have a particular physical orientation. The terminal connections are illustrated in FIG. 5B. This arrangement results in the temperature gradient shown in FIG. 5C, i.e., 65° C.–35° C.=30° C. This large temperature gradient (30° C.) may be reduced simply by re-configuring the terminal connections of the cells of the battery pack, i.e., without re-orienting the cells, as shown in FIG. 6(A-B).

As illustrated, with the same physical orientation, as illustrated in FIG. 6A, the terminal connections of the cells have been changed, as shown in FIG. 6B. This results in the temperature gradient for the battery pack being reduced, as shown in FIG. 6C. Specifically, the operating temperature gradient for the battery pack is now 60° C.–40° C.=20° C., i.e., a 10° C. improvement. This reduction from 30° C. to 20° C. improves the cycle lifetime, e.g., by as much as 400 cycles. In a battery pack that is designed to last ~1000 cycles, the improvement is significant.

Figure 7:
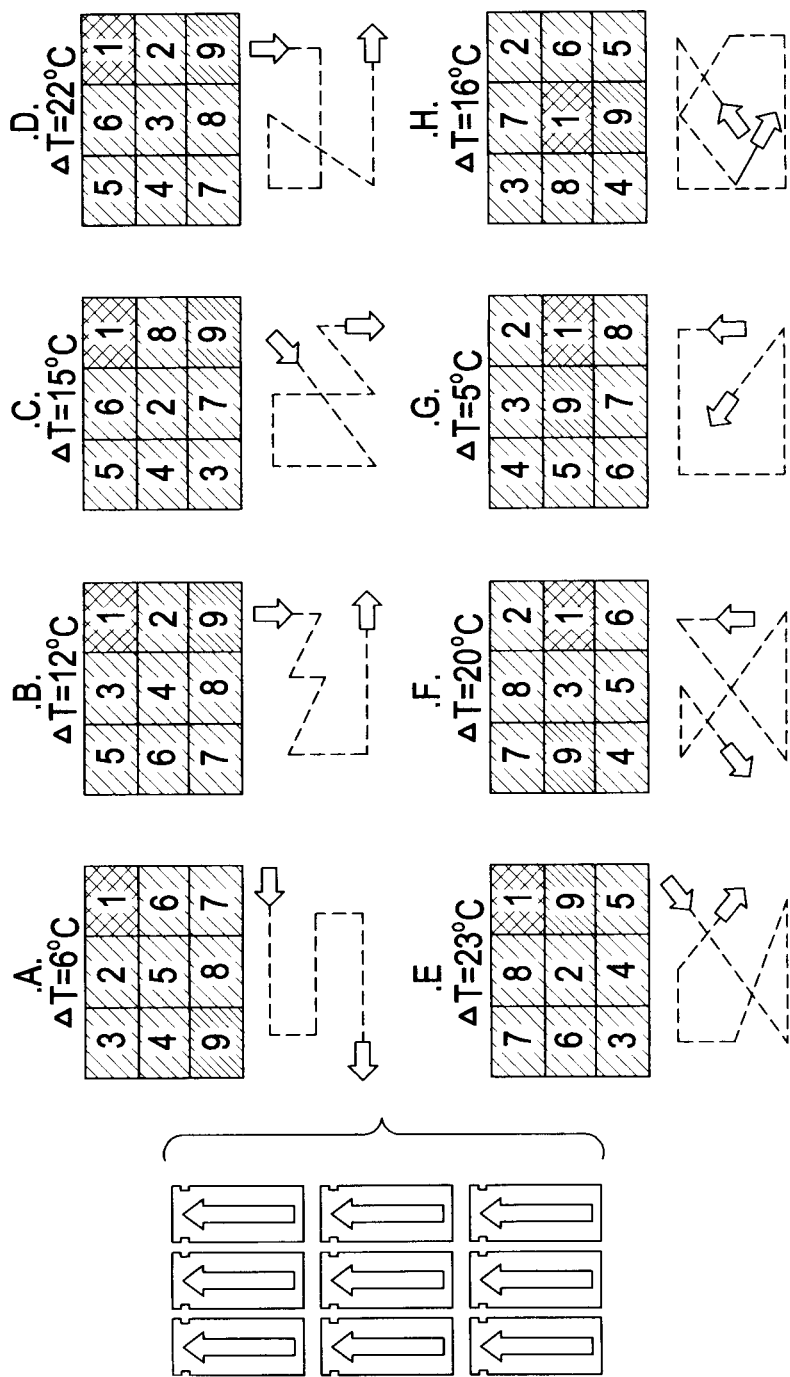
FIG. 7 illustrates other example battery pack cell arrangements.

FIG. 7 illustrates example terminal connection configurations for a 9 cell battery pack. In each example connection configuration, the cells are physically oriented within the pack as shown in the left hand view, whereas the terminal connections of the cells are altered to change the current flow through the pack as a whole as indicated with the dashed lines below each view. Thus, the current flow through the cells of the pack is illustrated by the dashed lines below the 9 cell matrix.

As may be appreciated from review of FIG. 7, using terminal connection A, a temperature gradient for the battery pack of 6° C. is achieved, whereas for terminal connection configurations shown in views B, C, and D of FIG. 7, battery pack temperature gradients of 12° C., 15° C., and 22° C. are achieved, respectively. Thus, for the nine cell battery pack illustrated in FIG. 7, terminal connection arrangement "A" achieves the most reduction in terms of temperature gradient from among the configurations A, B, C and D. The current flow in terminal connection A of FIG. 7 is oriented for the plurality of cells to achieve a serpentine current flow through the plurality of cells in the battery pack.

Similarly, it can be appreciated that terminal connection arrangement G in the lower row of FIG. 7 achieves the lowest temperature gradient for the battery pack from among terminal connection arrangements E, F, G and H, with terminal connection arrangement G achieving a 5° C. temperature gradient. The current flow for terminal connection arrangement G in FIG. 7 is oriented for the plurality of cells to achieve a peripheral current flow through the plurality of cells.

Figure 8:
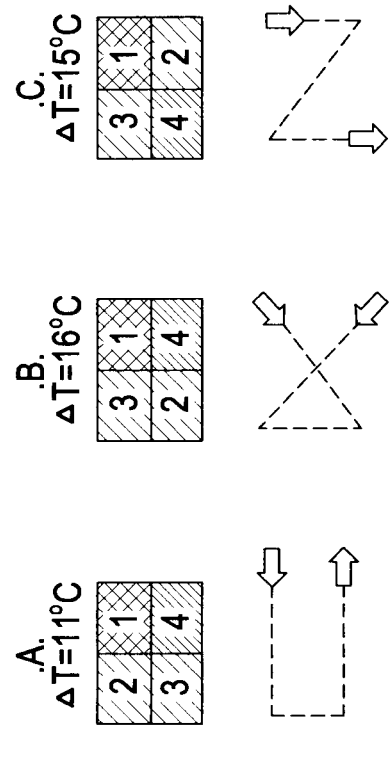
FIG. 8 illustrates another example battery pack cell arrangement.

FIG. 8 illustrates a stacked, four cell battery pack (in the leftward view), with example terminal connection arrangements A, B and C shown with their respective temperature gradients. As may be appreciated, the terminal connection arrangement A of FIG. 8 achieves the lowest temperature gradient for the stacked, four cell battery pack, i.e., 11° C. Again, terminal connection arrangement A of FIG. 8 is a peripheral current flow for the cells of the battery pack.

Figure 9:
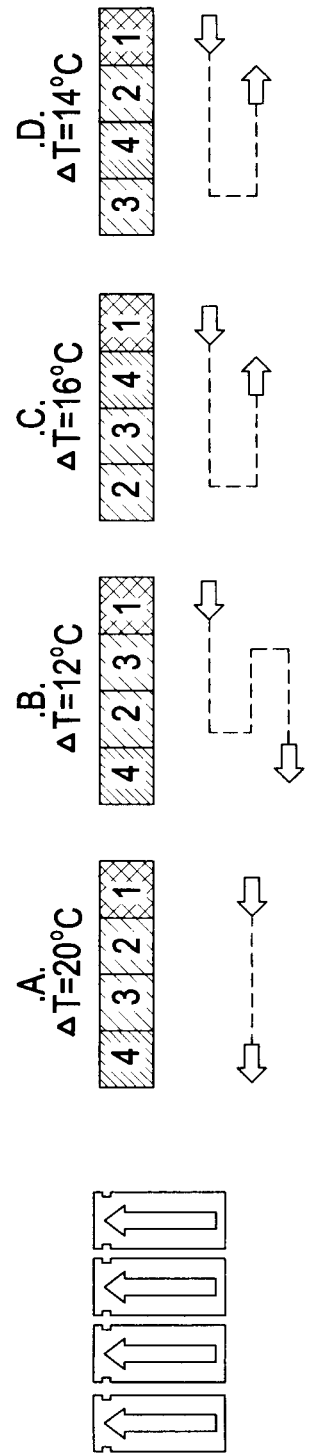
FIG. 9 illustrates another example battery pack cell arrangement.

FIG. 9 illustrates a linear four cell battery pack (in the leftward view), with example terminal connection arrangements A, B, C and D shown with their respective temperature gradients. As may be appreciated, the terminal connection arrangement B of FIG. 9 achieves the lowest temperature gradient for the linear four cell battery pack, i.e., 12° C. As may be appreciated, the current flow is oriented in terminal connection arrangement B as a serpentine current flow through the plurality of cells.

If may further be appreciated that by changing from a stacked to a linear arrangement, the temperature gradient for the battery pack may be reduced. Thus, without changing the terminal connections, the temperature gradient for the battery pack may be reduced. This may be appreciated by comparing terminal connection A in each of FIG. 8 and FIG. 9. By way of specific example, although the current flows from cell 1 to cell 2 to cell 3 to cell 4 in each of terminal connection A of FIG. 8 and terminal connection A of FIG. 9, the physical stacking of the cells in FIG. 8, configuration A, leads to a reduced temperature gradient for the battery pack as compared to the linear arrangement of the cells in configuration A of FIG. 9. However, stacking cells is not always preferable, as may be appreciated by comparison of configuration B of FIG. 8 and configuration B of FIG. 9.

Thus, an embodiment achieves a reduction in the temperature gradient for a battery pack by physically arranging the cells within the battery pack to specifically reduce the temperature gradient. As has been illustrated, this may be done by physically placing the cells within the battery pack with a particular configuration (e.g., stacking versus linear, reorienting the cells, etc.), this may be done by altering the current flow through the battery pack without reorienting the cells, or via a combination of the foregoing. Reducing the temperature gradient of the battery pack increases the cycle life of the cells and thus the battery pack, i.e., the cells retain their charging/discharging capacity for more cycles.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An apparatus, comprising:
a processor;
a memory operatively coupled to the processor; and
a battery pack supplying power to the processor and the memory;
said battery pack comprising:
a plurality of a cells, each of the plurality of cells having a predetermined operating temperature and wherein the plurality of cells are physically arranged in a configuration within the battery pack based upon the predetermined operating temperature of the plurality of cells in at least a portion of the battery pack, wherein the predetermined operating temperature of each of the plurality of cells is determined before arrangement of the cell within the battery pack.

2. The apparatus pack of claim 1, wherein one or more of the plurality of cells is placed in a position within the battery pack as a function of temperature of at least a portion of the battery pack.

3. The apparatus of claim 1, wherein the configuration results in a current flow oriented for the plurality of cells to achieve a serpentine current flow.

4. The apparatus of claim 1, wherein the configuration results in a current flow oriented for the plurality of cells to achieve a peripheral current flow.

5. The apparatus of claim 1, wherein the plurality of cells are arranged according to a configuration that reduces the temperature gradient of the battery pack.

6. The apparatus of claim 5, wherein the configuration reduces an end-to-end temperature gradient of the battery pack.

7. The apparatus of claim 1, wherein the plurality of cells are arranged to place a cell that achieves at least a predetermined operating temperature in a central part of the battery pack.

8. The apparatus of claim 1, wherein the plurality of cells are arranged to evenly space cells that achieve at least a predetermined operating temperature throughout the battery pack.

9. The apparatus of claim 1, wherein the plurality of cells are arranged to place at least one cell that remains under at least a predetermined operating temperature between two cells that achieve at least a predetermined operating temperature.

10. A battery pack, comprising:
a plurality of cells, each of the plurality of cells having a predetermined operating temperature and wherein the plurality of cells are physically arranged in a configuration within the battery pack based upon the predetermined operating temperature of the plurality of cells in at least a portion of the battery pack, wherein the predetermined operating temperature of each of the plurality of cells is determined before arrangement of the cell within the battery pack.

11. The battery pack of claim 10, wherein the configuration results in a current flow oriented for the plurality of cells to achieve a serpentine current flow.

12. The battery pack of claim 10, wherein the configuration results in a current flow oriented for the plurality of cells to achieve a peripheral current flow.

13. The battery pack of claim 10, wherein the plurality of cells are arranged according to a configuration that reduces the temperature gradient of the battery pack.

14. The battery pack of claim 13, wherein the configuration reduces an end-to-end temperature gradient of the battery pack.

15. The battery pack of claim 10, wherein the plurality of cells are arranged to place a cell that achieves at least a predetermined operating temperature in a central part of the battery pack.

16. The battery pack of claim 10, wherein the plurality of cells are arranged to evenly space cells that achieve at least a predetermined operating temperature throughout the battery pack.

17. The battery pack of claim 10, wherein the plurality of cells are arranged to place at least one cell that remains under at least a predetermined operating temperature between two cells that achieve at least a predetermined operating temperature.

18. A method, comprising:
determining, for a battery pack comprising a plurality of cells, each of the plurality of cells having a predetermined operating temperature, a current flow arrangement for the plurality of cells, wherein the determining is based upon the predetermined operating temperature of the plurality of cells in at least a portion of the battery pack, wherein the predetermined operating temperature of each of the plurality of cells is determined before arrangement of the cell within the battery pack;

said current flow arrangement being configured as a function of temperature of the at least a portion of the battery pack; and physically arranging the plurality of cells according to the determined current flow arrangement.

19. The method of claim 18, wherein the plurality of cells are arranged according to a configuration that reduces a temperature gradient of the battery pack.

\* \* \* \* \*